June 3, 1952

W. H. PARK 2,599,122

SEAL BETWEEN RELATIVELY ROTATABLE PARTS

Filed July 5, 1949

INVENTOR:
WILLIAM HUTCHESON PARK, DECEASED
HELEN PARK, EXECUTRIX

By Richardson, David and Nardon
ATTYS

UNITED STATES PATENT OFFICE 2,599,122

SEAL BETWEEN RELATIVELY ROTATABLE PARTS

William Hutcheson Park, deceased, late of Hooton, Wirral, England, by Helen Park, executrix, Hooton, Wirral, England, assignor to Sigmund Pumps Limited, Gateshead, England, a company of Great Britain Application July 5, 1949, Serial No. 103,112
In Great Britain July 5, 1948

4 Claims. (Cl. 286—26)

The present invention relates to an improved arrangement for providing a mechanical seal between relatively rotatable parts such as a housing and a shaft extending through it, the object of the invention being to provide a seal which is effective to prevent flow or leakage of a fluid between the relatively moving parts even in cases where some degree of eccentricity, axial misalignment or conditions of vibration exist.

The improved sealing arrangement according to the invention comprises a pair of co-operating sealing surfaces at one end of an annular space between the relatively rotatable parts one of which surfaces is fixed with regard to the first of the relatively rotatable parts and the other being a surface at one end of a sleeve adapted to float in said chamber, a pair of channel-section flexible rings disposed in the chamber with their channels towards one another and with the outer end of each against an abutment, the abutment for one of said rings being formed on the floating sleeve, and means whereby said rings may be biased away from one another to maintain contact between the co-operating sealing faces.

The flexible rings may be biased apart by a spring or as an alternative or in addition to such a spring means may be provided to enable a fluid pressure to be maintained in the annular space between the flexible channel section rings which is in excess of the pressure of the fluid against which the seal is to be maintained.

Figure 1:
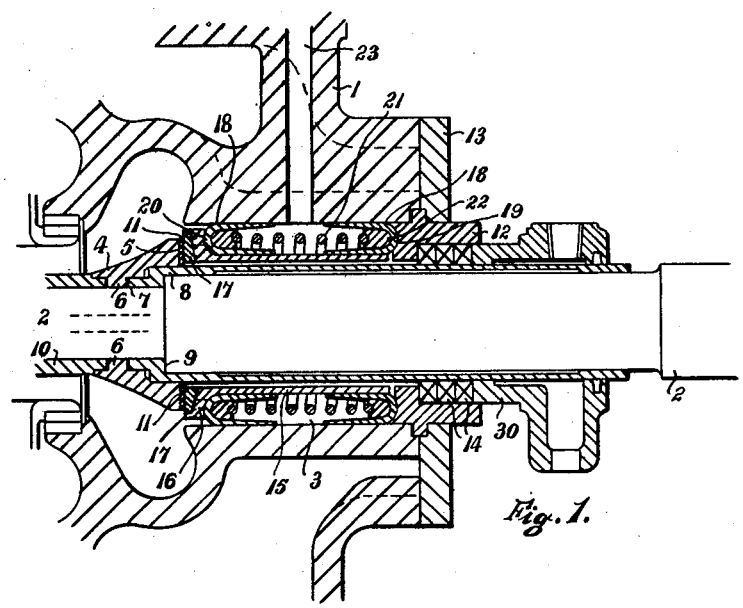
Figure 2:
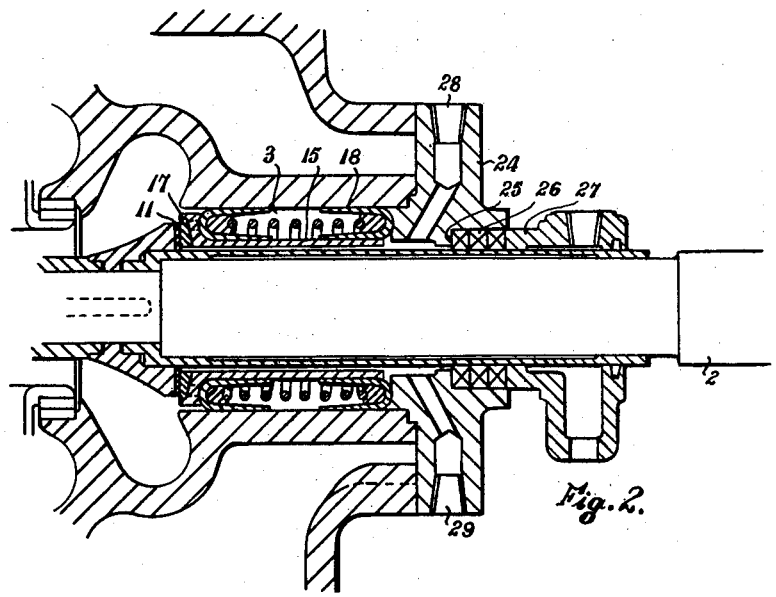

The invention is illustrated by way of example in the accompanying drawings as applied to a bearing for the driving shaft of a centrifugal pump at the point of entry of the shaft into the pump casing, Fig. 1 being a view in sectional side elevation of one form of the invention and Fig. 2 is a sectional side elevation of an alternative.

Referring to the drawings 1 is a part of the wall of the pump casing and 2 is the shaft, and the aperture in the wall 1 through which passes the shaft 2 is of a size to provide an annular space 3 around the shaft and extending through the aperture in the wall 1.

On the shaft 2 at the inner side of the wall 1 is fixedly mounted a ring 4 forming a radial shoulder extending over the greater part of the width of the annular space 3. In the case illustrated the ring 4 is provided with a stepped internal periphery presenting a flange 6 and a shoulder 7, the shaped interior of the ring 4 at one side of the flange 6 fitting against the correspondingly shaped end of a counterbored sleeve 8 fitted over the shaft 2 and engaging with the shoulder at the junction of the counterbores against a shoulder 9 formed on the shaft 2, the internal flange 6 being clamped against the end of the sleeve 8 by a sleeve 10 which may be an extension of the boss of the impeller (not shown) screwed or otherwise fixed on the shaft 2, whereby the ring 4 is clamped to the shaft 2. The radial shoulder 5 may however be formed on a part integral with the shaft 2.

The radial shoulder 5 is faced with a layer 11 of wear resistant material such as Stellite and this forms one of the sealing surfaces.

The outer end of the annular space 3 is closed by a counterbored ring 12 fixedly anchored to the wall of the casing 1 by a suitable cover plate 13, and packing rings 14 and a gland 30 provided between said ring 12 and the shaft 2.

Within the annular space 3 and extending throughout substantially the whole length thereof between the shoulder 5 on the ring 4 on the shaft 2 and the counterbored ring 12 is mounted a relatively thin sleeve 15 on an internal diameter such as to provide a clearance between the said sleeve 15 and the shaft 4. One end of the sleeve 15 is provided with an outward flange 16 the outer end surface of which may form the second sealing surface co-operating with the above described sealing surface 11 on the shoulder 5 on the shaft.

A ring insert 17 of a wear resistant material such as tungsten-lead, is however preferably provided to form the rubbing face on the radial surface of the flange 16 on the end of the sleeve.

Between the outer surface of the sleeve 15 and the wall of the aperture in the casing 1 are mounted a pair of "chevron" type flexible rings 18, i. e. rings of leather, rubber or like flexible impervious material of channel form in section, these rings 18 being mounted spaced from one another and with the channels facing each other and with the outer end 19 of one ring abutting the suitably grooved inner end of the counterbored ring 12 and the outer end 20 of the other ring abutting the suitably grooved outer face of the flange 16 on the end of the sleeve.

A coiled spring 21 surrounding the shaft 2 and if necessary used in conjunction with spreader rings 22, serves to urge the flexible rings 18 away from one another, and therefore the sealing surface of the ring 17 on the sleeve 15 against the sealing surface 11 on the shoulder 5 of the ring 4 on the shaft 2. The sleeve 15 being a floating member yieldingly supported by the flexible rings 18, sealing contact is maintained between the sealing surfaces 17 and 11 even in the presence of conditions resulting in some eccentricity between the shaft 2 and the housing in the casing wall 1, since the sleeve 15 can accommodate itself to resulting irregularities in the movement of the shaft 2 and the sealing surface 11 rotating with the shaft 2.

According to a further feature of the invention means may be provided to enable a pressure to be maintained between the flexible rings 18 in the annular chamber 3 equal to or in excess of the pressure to be sealed. For example in the case of a pump a conduit 23 may be provided for the delivery of fluid from the discharge side of the pump to the annular chamber 3 and between the rings, the discharge pressure of a pump usually being greater than the outside pressure at the sealing surfaces. Alternatively a separate source of excess pressure may be connected by way of conduit 23 with the annular space 3 between the rings 18 or a non-return grease nipple may be provided to enable oil or grease to be introduced to the space 3 under pressure with the aid of a grease gun.

The improved seal is equally effective to prevent leakage from within or into the casing 1 past the shaft 2, according as the pressure within the casing 1 is greater or less than the external pressure.

When necessary effective cooling of the parts of the seal may be carried out in a simple manner.

In this case, as shown in Fig. 2, the outer end of the aperture through the casing 1 is closed by an apertured end plate 24 surrounding the shaft 2, this plate 24 being counterbored as shown at 25 for the reception of packing rings 26 and a gland ring 27.

Inlet and outlet passages 28 and 29 for water or other cooling fluid are provided in the plate 24 these passages leading to the annular space 3 at a point beyond the outer end of the floating sleeve 15 so that the cooling fluid has access to the space between the floating sleeve 15 and the shaft 2 and to the parts bearing the sealing surfaces 11 and 17, in rubbing contact with one another.

What is claimed is:

1. Means for providing a mechanical seal between a housing and a shaft extending through it and arranged for relative rotation, comprising an annular sealing surface at one end of an annular space between the said relatively rotatable parts and fixed with regard to one of said relatively rotatable parts, a sleeve surrounding the shaft with clearance and adapted to float in said annular space, a second annular sealing surface at one end of said sleeve and adapted to make rubbing contact with the first mentioned sealing surface, a pair of channel section flexible rings disposed in the annular space and surrounding the floating sleeve with the open ends of the channels towards one another, a first abutment on the sleeve engaged by the outer surface of the bottom of one of said channel section flexible rings and a second abutment fixed with regard to the housing and engaged by the outer surface of the bottom of the other of said channel section flexible rings, said rings being frictionally held against the housing on one side and frictionally held against the sleeve on the other side, and means biasing said rings away from one another to maintain rubbing contact between the two annular sealing surfaces.

2. Means for providing a mechanical seal between a housing and a shaft extending through it and arranged for relative rotation, comprising an annular sealing surface at one end of an annular space between the said relatively rotatable parts and fixed with regard to one of said relatively rotatable parts, a sleeve surrounding the shaft with clearance and adapted to float in said annular space, a second annular sealing surface at one end of said sleeve and adapted to make rubbing contact with the first mentioned sealing surface, a pair of channel section flexible rings disposed in the annular space and surrounding the floating sleeve with the open ends of the channels towards one another, a first abutment on the sleeve engaged by the outer surface of the bottom of one of said channel section flexible rings and a second abutment fixed with regard to the housing and engaged by the outer surface of the bottom of the other of said channel section flexible rings and a compression spring surrounding the sleeve and engaging with its ends within the channel section flexible rings, said rings being frictionally held against the housing on one side and frictionally held against the sleeve on the other side.

3. Means for providing a mechanical seal between a housing and a shaft extending through it and arranged for relative rotation, comprising an annular sealing surface at one end of an annular space between the said relatively rotatable parts and fixed with regard to one of said relatively rotatable parts, a sleeve surrounding the shaft with clearance and adapted to float in said annular space, a second annular sealing surface at one end of said sleeve and adapted to make rubbing contact with the first mentioned sealing surface, a pair of channel section flexible rings disposed in the annular space and surrounding the floating sleeve with the open ends of the channels towards one another, a first abutment on the sleeve engaged by the outer surface of the bottom of one of said channel section flexible rings and a second abutment fixed with regard to the housing and engaged by the outer surface of the bottom of the other of said channel section flexible rings, said rings being frictionally held against the housing on one side and frictionally held against the sleeve on the other side, and a conduit leading through the housing to the annular space between the said channel section flexible rings for the introduction of a pressure fluid.

4. Means for providing a mechanical seal between a housing and a shaft extending through it and arranged for relative rotation, comprising an annular sealing surface at one end of an annular space between the said relatively rotatable parts and fixed with regard to one of said relatively rotatable parts, a sleeve surrounding the shaft with clearance and extending over a part only of the length of the said annular space and adapted to float in said annular space, a second annular sealing surface at one end of said sleeve and adapted to make rubbing contact with the first mentioned sealing surface, a pair of channel section flexible rings disposed in the annular space and surrounding the floating sleeve with the open ends of the channels towards one another, a first abutment on the sleeve engaged by the outer surface of the bottom of one of said channel section flexible rings and a second abutment fixed with regard to the housing and engaged by the outer surface of the bottom of the other of said channel section flexible rings, said rings being frictionally held against the housing on one side and frictionally held against the sleeve on the other side, and means biasing said rings away from one another to maintain rubbing contact between the two annular sealing surfaces, and passages to and from the exterior to end of the annular space remote from the sealing surfaces for the circulation of cooling fluid in the space between the shaft and the floating sleeve.

HELEN PARK,
*Executrix of the Estate of William Hutcheson Park, Deceased.*

REFERENCES CITED

The following references are of record in the file of this patent:

UNITED STATES PATENTS

| Number | Name | Date |
|---|---|---|
| 1,898,278 | Weis | Feb. 21, 1933 |
| 2,419,588 | Pasco | Apr. 29, 1947 |
| 2,479,236 | Hanson | Aug. 16, 1949 |

FOREIGN PATENTS

| Number | Country | Date |
|---|---|---|
| 564,714 | Great Britain | Oct. 10, 1944 |